US012809095B2

(12) United States Patent
Xiao et al.

(10) Patent No.: US 12,809,095 B2
(45) Date of Patent: Nov. 24, 2026

(54) RELATIVE POSITION CONTROL FOR FIBERS

(71) Applicant: CORNING RESEARCH & DEVELOPMENT CORPORATION, Corning, NY (US)

(72) Inventors: Qijun Xiao, Fremont, CA (US); Shudong Xiao, Fremont, CA (US); Andy Fenglei Zhou, Fremont, CA (US)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 245 days.

(21) Appl. No.: 18/406,441

(22) Filed: Jan. 8, 2024

(65) Prior Publication Data

US 2024/0142710 A1 May 2, 2024

Related U.S. Application Data

(63) Continuation of application No. PCT/US2022/034813, filed on Jun. 24, 2022.

(Continued)

(51) Int. Cl.

*G02B 6/36* (2006.01)
*G02B 6/38* (2006.01)
*G02B 6/40* (2006.01)

(52) U.S. Cl.

CPC ......... *G02B 6/3636* (2013.01); *G02B 6/3616* (2013.01); *G02B 6/3839* (2013.01); *G02B 6/40* (2013.01)

(58) Field of Classification Search

CPC .... G02B 6/3636; G02B 6/364; G02B 6/3838; G02B 6/3839

See application file for complete search history.

(56) References Cited

U.S. PATENT DOCUMENTS 4,784,456 A * 11/1988 Smith .................. G02B 6/3805 385/71
5,006,201 A 4/1991 Kaukeinen (Continued)

OTHER PUBLICATIONS

T. Hosaka et al. Low-loss single polarisation fibres with asymmetrical strain birefringence. Electronics Letters, vol. 17 No. 15, pp. 530-531, Jul. 1981 (https://doi.org/10.1049/el:19810371) (Year: 1981).*

(Continued)

*Primary Examiner* — Michael Stahl
(74) *Attorney, Agent, or Firm* — Tamika A. Crawl-Bey

(57) ABSTRACT

A system for maintaining relative position of separate fibers is provided. The system comprises a fiber holder and fibers extending parallel along a Z-axis. The fibers include a first and second fiber, both having a coating and a core section. The fiber holder has a first and second alignment slots. The first alignment slot defines a first recess in a first surface of the fiber holder. The first recess is configured to receive the first fiber therein to provide frictional resistance to the first fiber. The second alignment slot defines a second recess in the first surface. The second recess is configured to receive the second fiber therein to provide frictional resistance to the second fiber. The first alignment slot is positioned in a fixed spaced apart manner from the second alignment slot to maintain at least a relative position of the first fiber and the second fiber.

16 Claims, 18 Drawing Sheets

Related U.S. Application Data

(60) Provisional application No. 63/219,868, filed on Jul. 9, 2021.

(56) References Cited

U.S. PATENT DOCUMENTS

| | | | | |
|---|---|---|---|---|
| 5,566,268 | A * | 10/1996 | Radliff | G02B 6/3636 385/136 |
| 6,266,472 | B1 | 7/2001 | Norwood et al. | |
| 6,421,493 | B1 | 7/2002 | Burek et al. | |
| 7,445,832 | B2 | 11/2008 | Matsumoto et al. | |
| 10,816,326 | B2 | 10/2020 | Chang et al. | |
| 10,908,362 | B1 | 2/2021 | Janta-Polczynski | |
| 2002/0106155 | A1 | 8/2002 | Brun et al. | |
| 2003/0113089 | A1 | 6/2003 | Lee et al. | |
| 2021/0055490 | A1 | 2/2021 | Bennett et al. | |
| 2023/0168442 | A1 * | 6/2023 | Dannoux | G02B 6/3897 385/78 |

OTHER PUBLICATIONS

European Patent Application No. 22744884.2 Communication pursuant to Article 94(3) EPC dated Sep. 15, 2025; 6 Pages; European Patent Office.

* cited by examiner

RELATIVE POSITION CONTROL FOR FIBERS

PRIORITY APPLICATIONS

This application is a continuation of International Application Serial No. PCT/US2022/034813 filed on Jun. 24, 2022, which claims the benefit of priority of U.S. Provisional Application No. 63/219,868, filed on Jul. 9, 2021. The content of each priority application is relied upon and incorporated herein by reference in its entirety.

FIELD

Embodiments of the present invention relate to systems, apparatuses, and methods for passive control of the relative position of a plurality of separate fibers, such as for performing a subsequent alignment and connection of the separate fibers to an interface.

BACKGROUND

Managing the relative position (e.g., lateral position and/or rotational position) of separate fibers within a fiber array may be difficult when connecting those fibers to an interface. In this regard, the fibers may be bent or otherwise manipulated during the interface connection process—causing misalignment and increasing signal loss over the interface. This is particularly true when trying to connect/form a high density fiber interface. Notably, misalignment may be a major issue, especially where fibers are being connected to waveguides, as linear alignment of optical fibers to waveguides must typically fit within a tolerance of 1 micron.

The above noted difficulties may be especially true where these fiber arrays include one or more polarization maintaining fibers. In such cases, relative rotational position of the polarization maintain fibers may be important for reducing signal loss over the connected interface. In order to align the polarization axes of two or more polarization maintaining fibers in a fiber array, these fibers must maintain alignment during assembly and the remainder of the manufacturing process. Maintaining the alignment of the polarization maintaining fibers through the manufacturing process may be a challenging part of the process and, as a result, it may be difficult to accomplish the desired output tolerances for polarization maintaining fiber arrays. In some cases, slight misalignment between the polarization maintaining fibers of a polarization maintaining fiber array may cause a decreased polarization extinction ratio (PER) of the polarization maintaining fibers to the point that the fiber array is no longer useful for a particular application. In general, a high PER for a polarization maintaining optical fiber used in telecommunications and data center applications is considered to be 30 dB or greater.

SUMMARY

Various embodiments of the present invention relate to methods, systems, and devices, such as a fiber holder, that assist in maintaining the relative position of fibers so that fibers may subsequently be aligned and connected to an interface. Even where the fibers are subsequently bent after being secured to the fiber holder, the fiber holder may assist in retaining fibers in the correct linear and rotational position. Fiber cores may, thus, be secured to an interface with a reduced pitch and increased density without deteriorating the connection, performance, and/or the polarization extinction ratio (PER) between the fiber cores and the interface.

Systems and devices herein include embodiments where a fiber holder is configured to control the position of individual fibers that are not retained within a fiber ribbon. If the fibers are bent after being secured to the fiber holder, the relative rotational position of the fibers do not change. For example, where a fiber extends along a Z-axis, the fiber will not rotate relative to the Z axis. By maintaining the relative rotational position of the fibers in this manner, the PER for the fibers may be maintained, such as at an optimal level. By avoiding the need for a customized fiber ribbon, the fiber array design may be achieved more rapidly and with increased cost-efficiency.

Accordingly, separate fibers may be aligned with alignment slots in the fiber holder so as to maintain relative lateral position and rotational position with respect to each other during subsequent connections. The fiber holder and associated systems and methods described herein, thus, provide a solution that allows the fiber array to be secured appropriately and with the securement being achieved more rapidly and with increased cost-efficiency.

In an example embodiment, a system for maintaining relative position of separate fibers for performing a subsequent alignment and connection of the separate fibers to an interface is provided. The system comprises a plurality of fibers extending parallel in a same direction along a Z-axis. The plurality of fibers includes at least a first fiber and a second fiber. Each fiber of the plurality of fibers includes at least one coating and a core section. The system also comprises a fiber holder including a first alignment slot for receiving the first fiber and a second alignment slot for receiving the second fiber. The first alignment slot defines a first recess defined in a first surface of the fiber holder, and the first recess is configured to receive at least a portion of the first fiber therein such that an outer coating of the first fiber rests within the first recess to provide frictional resistance to resist movement of the first fiber. The second alignment slot defines a second recess defined in the first surface of the fiber holder, and the second recess is configured to receive at least a portion of the second fiber therein such that an outer coating of the second fiber rests within the second recess to provide frictional resistance to resist movement of the second fiber. The first alignment slot is positioned in a fixed spaced apart manner from the second alignment slot in at least one of a direction along a Y-axis or a direction along an X-axis so as to maintain at least a relative position of the first fiber and the second fiber with respect to each other.

In some embodiments, the fiber holder may comprise a first portion and a second portion. The first alignment slot and the second alignment slot may be provided on the first portion. The first portion may be configured to contact the first fiber at two or more distinct locations, and the second portion may be configured to contact the first fiber at at least one location. The first portion and the second portion may provide frictional resistance to resist movement of the first fiber.

In some embodiments, the plurality of fibers may include a first set of two or more fibers and a second set of two or more fibers. The first set of two or more fibers may include the first fiber and the second fiber. Each fiber of the first set of two or more fibers may be provided at a first Y-position with respect to the Y-axis, and each fiber of the second set of two or more fibers may be provided at a second Y-position with respect to the Y-axis. The first Y-position and the second Y-position may be different. In some embodiments, the fiber holder may comprise a first portion and a second portion. The second portion may be configured to contact a fiber of the second set of two or more fibers at two or more distinct locations, and the first portion may be configured to contact the same fiber of the second set of two or more fibers at at least one location. In some related embodiments, the first set of two or more fibers may contact the second set of two or more fibers. In some embodiments, the second set of two or more fibers may be provided at intermittent positions between fibers of the first set of two or more fibers along the X-axis.

In some embodiments, the plurality of fibers may include at least one polarization-maintaining optical fiber. The outer coating of the first fiber may rest within the first recess to provide frictional resistance to resist rotational movement of the first fiber. The outer coating of the second fiber rests within the second recess to provide frictional resistance to resist rotational movement of the second fiber. In some embodiments, all fibers of the plurality of fibers are polarization-maintaining optical fibers. In some embodiments, a polarization-maintaining optical fiber of the at least one polarization maintaining optical fiber may comprise a core and two stress rods, with the core being provided in a center of a cross section of the polarization-maintaining optical fiber and the two stress rods being provided on opposite sides of the core.

In some embodiments, a plurality of alignment slots may be defined within the first surface, and a protrusion may be provided between each of the plurality of alignment slots. In some related embodiments, the plurality of fibers may include a first set of two or more fibers and a second set of two or more fibers. Each fiber of the first set of two or more fibers may be provided at a first Y-position with respect to the Y-axis, and each fiber of the second set of two or more fibers may be provided at a second Y-position with respect to the Y-axis. The first Y-position and the second Y-position may be different. Each protrusion may be configured to contact a fiber of the first set of two or more fibers and a fiber of the second set of two or more fibers.

In some embodiments, the fiber holder may be capable of being removed after the fibers are connected to the interface. In some embodiments, at least one of the first alignment slot or the second alignment slot may possess a partial triangular, a partial trapezoidal, a partial rectangular, or a partial curvilinear cross sectional shape. In some embodiments, the fiber holder may comprise a first portion and a second portion, and the first portion and the second portion may possess an identical shape.

In another example embodiment, a fiber holder is provided for maintaining relative position of separate fibers for performing a subsequent alignment and connection of the separate fibers to an interface. The fiber holder comprises a first alignment slot for receiving a first fiber extending in a direction parallel to a Z-axis and a second alignment slot for receiving a second fiber extending in a direction parallel to the Z-axis. The first alignment slot defines a first recess defined in a first surface of the fiber holder, and the first recess is configured to receive at least a portion of the first fiber therein such that an outer coating of the first fiber rests within the first recess to provide frictional resistance to resist movement of the first fiber. The second alignment slot defines a second recess defined in the first surface of the fiber holder, and the second recess is configured to receive at least a portion of the second fiber therein such that an outer coating of the second fiber rests within the second recess to provide frictional resistance to resist movement of the second fiber. The first alignment slot is positioned in a fixed spaced apart manner from the second alignment slot in at least one of a direction along a Y-axis or a direction along an X-axis so as to maintain at least a relative position of the first fiber and the second fiber with respect to each other.

In some embodiments, the fiber holder may include a first portion and a second portion, and the first alignment slot and the second alignment slot may be provided on the first portion. The first portion may be configured to contact the first fiber at two or more distinct locations, and the second portion may be configured to contact the first fiber at at least one location. The first portion and the second portion may provide frictional resistance to resist movement of the first fiber.

In some embodiments, the first fiber and the second fiber may be a part of a first set of two or more fibers. Each fiber of the first set of two or more fibers may be provided at a first Y-position with respect to the Y-axis. The first portion may be configured to contact each fiber of the first set of two or more fibers at two or more distinct locations, and the second portion may be configured to contact each fiber of the first set of two or more fibers at at least one location. The second portion may be configured to contact each fiber of a second set of two or more fibers at two or more distinct locations, and the first portion may be configured to contact each fiber of the second set of two or more fibers at at least one location. Each fiber of the second set of two or more fibers may be provided at a second Y-position with respect to the Y-axis, and the first Y-position and the second Y-position may be different.

In some embodiments, when the first portion and the second portion are brought together, the first set of two or more fibers may contact the second set of two or more fibers. In some embodiments, the first fiber may comprise a polarization-maintaining optical fiber, and the outer coating of the first fiber may rest within the first recess to provide frictional resistance to resist rotational movement of the first fiber.

In yet another example embodiment, a method for maintaining relative position of a plurality of fibers is provided. The method comprises providing a first fiber, providing a second fiber, and providing a fiber holder. The fiber holder includes a first alignment slot for receiving a first fiber extending in a direction parallel to a Z-axis and a second alignment slot for receiving a second fiber extending in a direction parallel to the Z-axis. The first alignment slot defines a first recess defined in a first surface of the fiber holder, and the first recess is configured to receive at least a portion of the first fiber therein such that an outer coating of the first fiber rests within the first recess to provide frictional resistance to resist movement of the first fiber. The second alignment slot defines a second recess defined in the first surface of the fiber holder, and the second recess is configured to receive at least a portion of the second fiber therein such that an outer coating of the second fiber rests within the second recess to provide frictional resistance to resist movement of the second fiber. The first alignment slot is positioned in a fixed spaced apart manner from the second alignment slot in at least one of a direction along a Y-axis or a direction along an X-axis so as to maintain at least a relative position of the first fiber and the second fiber with respect to each other. The method further comprises placing the first fiber within the first alignment slot and placing the second fiber within the second alignment slot.

In some embodiments, the fiber holder provided for the method may comprise a first portion and a second portion. The first alignment slot and the second alignment slot may be provided on the first portion. When the first portion and the second portion are brought together, the first portion may be configured to contact the first fiber at two or more distinct locations and the second portion may be configured to contact the first fiber at at least one location. The first portion and the second portion may provide frictional resistance to resist movement of the first fiber. The method may also comprise bringing the first portion and the second portion together, with the first fiber positioned within the first alignment slot and the second fiber within the second alignment slot.

In another example embodiment, a method for maintaining relative lateral and rotational position of a plurality of fibers is provided. This method comprises providing a first set of two or more fibers, providing a second set of two or more fibers, providing a first portion, and providing a second portion. The first portion has a first surface and two or more alignment slots defined in the first surface, and the first portion is configured to provide frictional resistance to resist rotation of the first set of two or more fibers. The second portion has a second surface and two or more alignment slots defined in the second surface, and the second portion is configured to provide frictional resistance to resist rotation of the second set of two or more fibers. The method also comprises placing the first set of two or more fibers in the two or more alignment slots defined in the first surface, placing the second set of two or more fibers in the two or more alignment slots defined in the second surface, aligning the first portion and the second portion, and urging the first portion and the second portion towards each other with the first surface and the second surface facing each other.

In some embodiments, the method may also include applying adhesive to the two or more alignment slots defined within the first surface or the two or more alignment slots defined within the second surface. In some embodiments the method may also include applying adhesive between the first surface and the second surface. In some embodiments, at least one of the first set of two or more fibers may be a polarization-maintaining optical fiber.

Further areas of applicability of the present invention will become apparent from the detailed description provided hereinafter. It should be understood that the detailed description and specific examples, while indicating example preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DETAILED DESCRIPTION

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Like numerals within FIGS. 3A-3G, 4A-4C, and 5A-5C are intended to refer to similar features. For example, elements 350 and 450 both refer to a fiber holder, and elements 470 and 570 both refer to an interface.

Figure 1A:
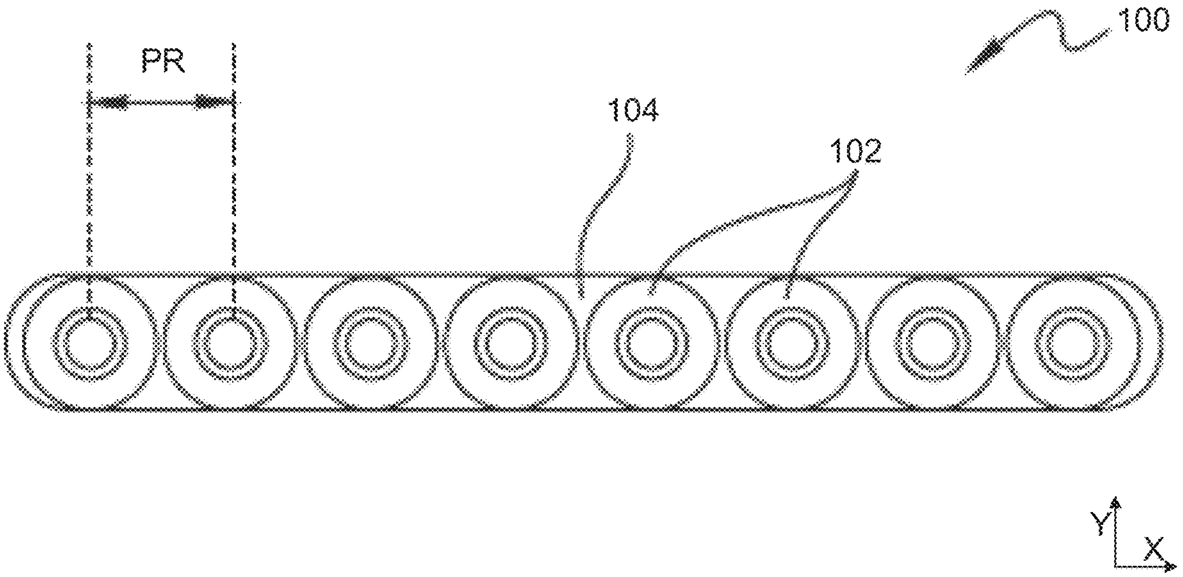
FIG. 1A is a cross sectional view of a fiber ribbon, in accordance with some embodiments discussed herein.
Figure 1B:
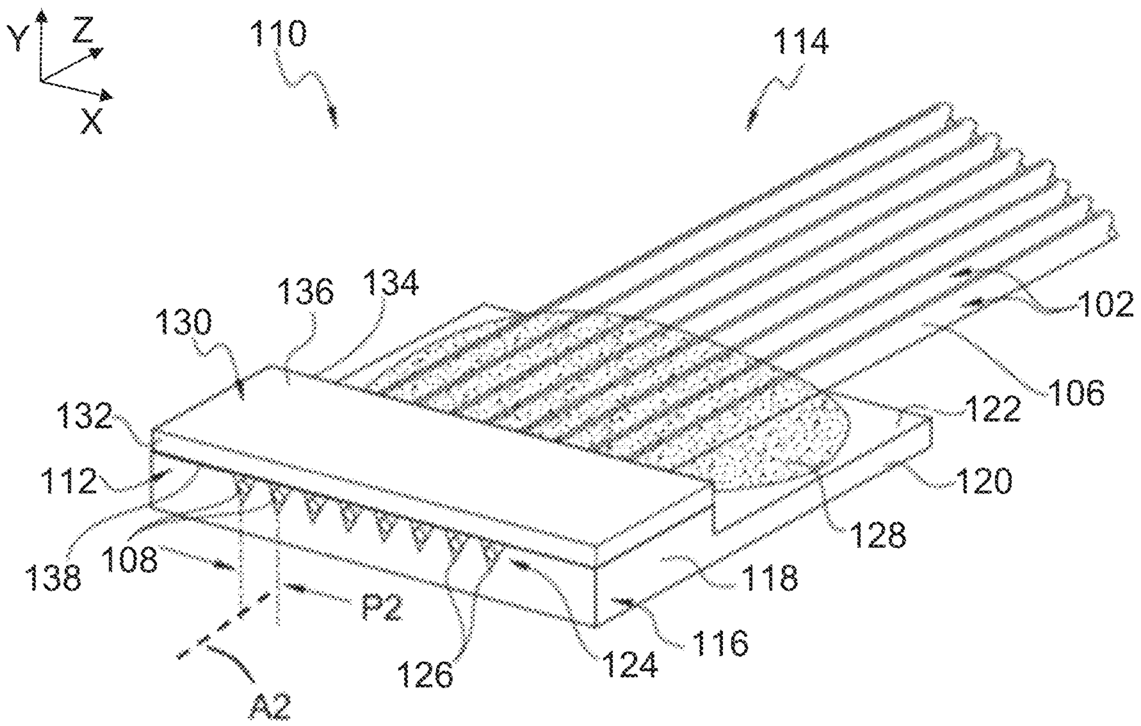
FIG. 1B is a perspective view of an assembled high-density fiber array unit (FAU), in accordance with some embodiments discussed herein.

Fiber ribbons may be used to contain and control one or more fibers positioned therein. However, these fiber ribbons may be very costly and time-consuming to use, especially where fiber ribbons are used for long distances. Moreover, the fiber ribbons maintain the fibers in a preset pattern that does not allow for customization during connection to interfaces. FIG. 1A illustrates a fiber ribbon 100 comprising a plurality of fibers 102 and an outer jacket 104. The outer jacket 104 may be formed of a polymer and may comprise one or more layers (e.g., matrix layers). In one example, the fiber ribbon 100 comprises multiples of 8 small diameter fibers 102, e.g., 8, 12, 16, 24, etc. In an example, the outer jacket 104 surrounds the fibers 102 except for, in some embodiments, one or more select sections. In such embodiments, the fiber ribbon 100 may comprise one or more bonded sections that include the outer jacket 104 and one or more unbonded sections that do not include the outer jacket 104 or that do not include the entire outer jacket 104 (e.g., less than all matrix layer(s)). The fibers 102 in the fiber ribbon 100 have a ribbon pitch (PR).

Where fiber ribbons are used and the fibers are not bent in any way, the pitch between fibers is large, so fibers are not densely packed together at a fiber array unit (FAU). FIG. 1B illustrates a perspective view of a fiber array unit (FAU) 114. The front-end section 118 has a substantially planar top surface (similar to 121 of FIG. 1C) while the back-end section 120 has a substantially planar top surface 122 and a back end (similar to 125 of FIG. 1D). In an example, the top surface of the front-end section 118 is elevated relative to the top surface 122 of the back-end section 120. The front-end section 118 includes an array 124 of grooves 126 formed in the planar top surface and that run parallel to the central axis A2. In an example, the grooves 126 are V-grooves as shown. In an example, the support substrate 116 is made of glass, such as silica glass.

Each of the fibers 102 has an end section 107 (see FIG. 1D) with an end face 108. Portions of the outer jacket 104 or the coated section 106 may be removed to expose one or more of the fibers 102 at sections near the end face 108 (see FIG. 1B). The array 124 of grooves 126 of the front-end section 118 of the support substrate 116 are sized to accommodate the bare glass end sections 107 (see FIG. 1D) of the fibers 102 while the back-end section 120 accommodates the protective coating 106 of the fibers 102. Once the end sections 107 (see FIG. 1D) of the fibers 102 are supported in the array 124 of grooves 126, then a bonding agent (e.g. epoxy or adhesive) 128 may be applied to the fibers 102 at the back-end section 120, as shown in FIG. 1B. A cover 130 having a front end 132, a back end 134, a top surface 136, and a bottom surface 138 is then placed over the top of the array 124 of the grooves 126 to secure the end sections 107 (see FIG. 1D) of the fibers 102 in the front-end section 118 of the support substrate 116. The cover 130 is held in place by the bonding agent 128 contacting the back end 134 of the cover 130. The bonding agent 128 may also be added to the array 124 of grooves 126. In an example, the cover 130 is made of glass, such as silica glass.

End faces 108 of the fibers 102 reside substantially at the front-end section 118 of the support substrate 116. The FAU 114 supports the fibers 102, positioning the fibers 102 spaced apart from each other with a pitch P2 at the end face 112. The fibers are all provided at the same Y-position relative to the Y-axis, and the fibers are not bent in any way. Thus, the pitch (PR) of fibers at the fiber ribbon 100 is equal to the pitch (P2) of fibers when the fibers are secured in the grooves 126. The glass sections of the fibers 102A and 102B are interleaved in the grooves 126 of the support substrate 116 to define the connector 110 introduced in FIG. 1B.

In some cases, multiple fiber ribbons are used, or fibers may be provided in multiple layers. These fibers may be bent to ensure that they are provided in a single layer for connection at the FAU. However, by bending the fibers, the linear and rotational position of the fibers may be altered so that the fibers will not align properly with the grooves of an FAU. Poor alignment may result in a suboptimal PER and reduced performance. Additionally, alignment issues may increase the difficulty of accomplishing the desired output tolerances for polarization maintaining fiber arrays.

Figure 1C:
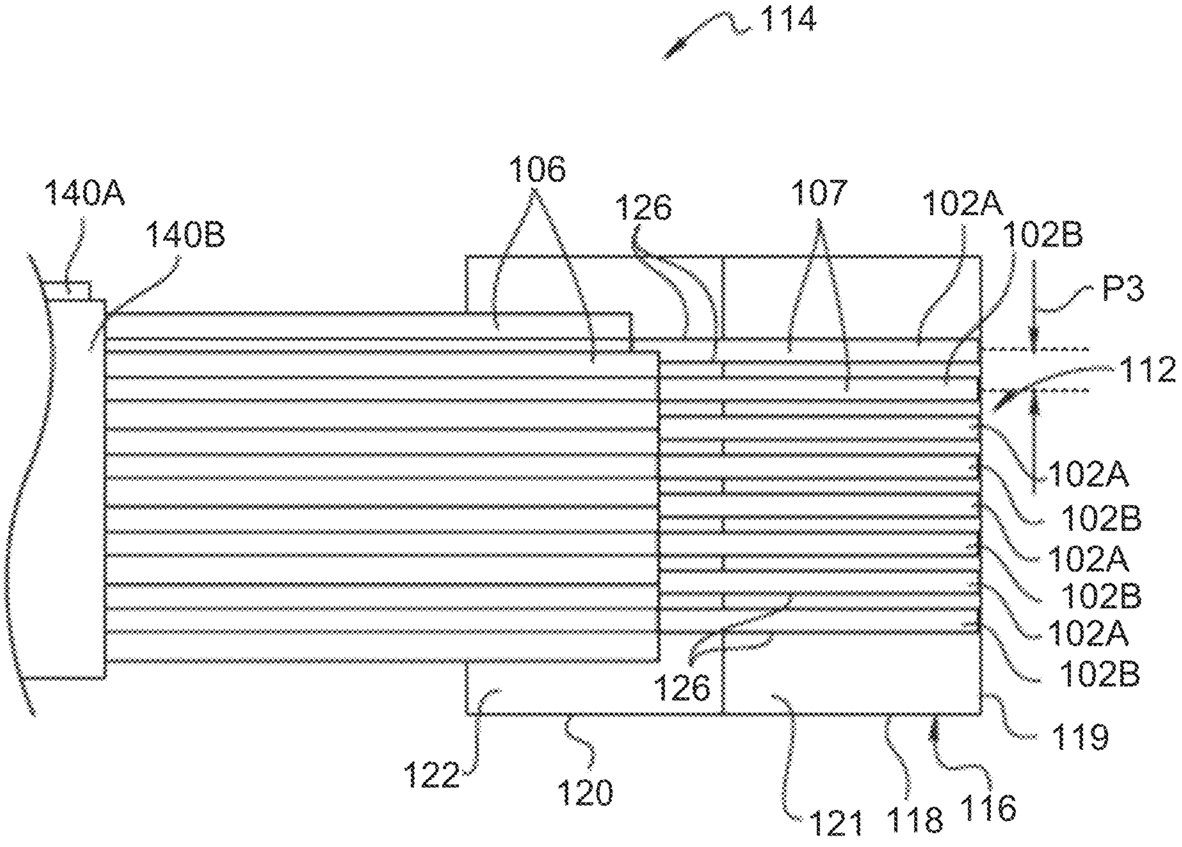
FIG. 1C is a top view of a high-density interconnect with two different fiber ribbons that are interleaved, in accordance with some embodiments discussed herein.

FIG. 1C is a top view that illustrates an example embodiment of how two sets of fibers (denoted 102A and 102B) of a respective first ribbon 140A and second ribbon 140B may be interleaved when forming the FAU 114. As part of the interleaving process in this example and the examples below, when starting with two fiber ribbons 140A and 140B, the outer jacket 104 (see FIG. 1A) and coating sections 106 (see FIG. 1B) of the fibers 102 (see FIG. 1B) are removed from the end section 107 (see FIG. 1D) of each of the fibers 102A and 102B to expose the respective glass sections of each fiber. This process may be performed using commercially available mechanical or thermal strippers. Fibers 102A, 102B may extend to front end 119 of the support substrate 116, with exposed glass end sections 107 resting on grooves 126. By providing a first ribbon 140A and a second ribbon 140B at two different Y-positions with respect to the Y-axis, the pitch (P3) between fibers may be reduced to approximately half of the pitch (P2, see FIG. 1B) where only a single ribbon is used. However, the use of a first ribbon 140A and a second ribbon 140B presents additional issues with controlling the rotational and/or linear position of the fibers, and this concern has caused many to avoid using the multi-layered approach with a first ribbon and a second ribbon. In particular, the issues have caused many to avoid the multi-layered approach where polarization maintaining fiber arrays are used because controlling the rotational position of fibers may be critical for such fiber arrays.

Figure 1D:
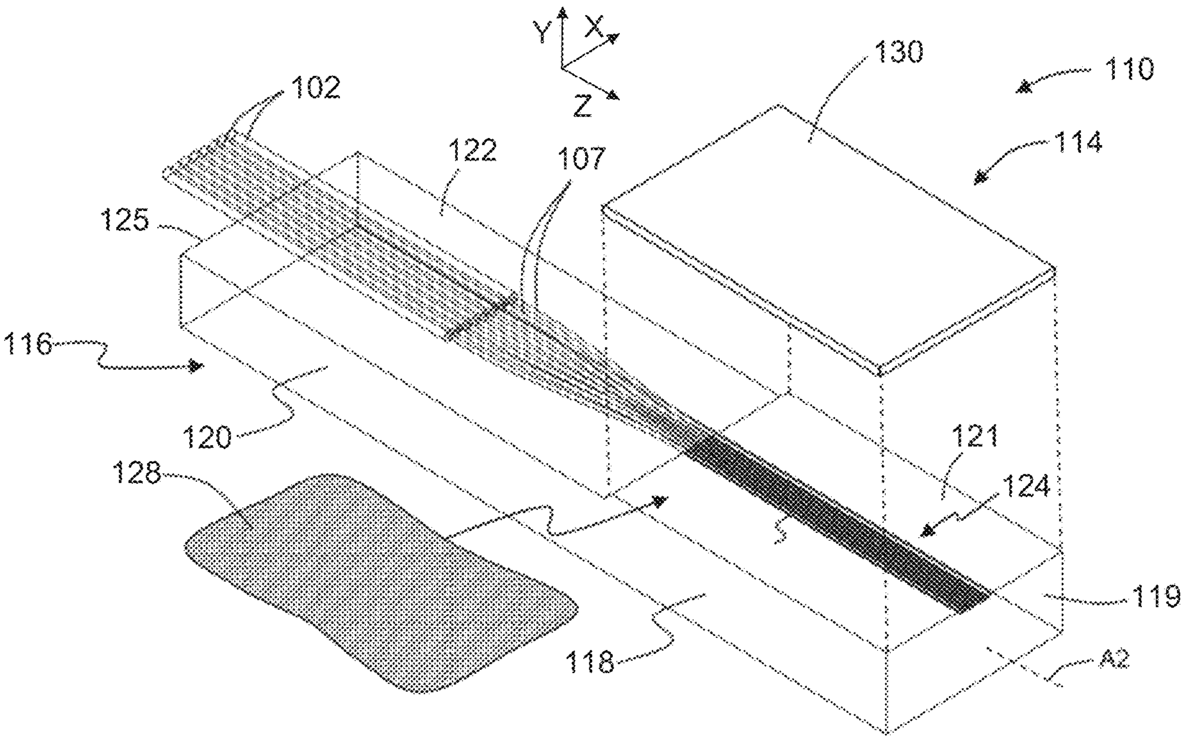
FIG. 1D is a perspective and partially exploded view of a high-density fiber array unit (FAU) illustrating fibers with a fan-in configuration, in accordance with some embodiments discussed herein.

In some cases, fibers may be provided in a single layer (such as in a fiber single ribbon) and the fibers may be bent to reduce the pitch at areas where the fibers connect to the fiber array unit (FAU). Bending may occur in a manner that retains fibers within a single plane. Like the approach described in reference to FIG. 1C, this bending approach may similarly cause the fibers to have an altered linear and rotational position so that the fibers will not align properly with the grooves of a fiber array unit (FAU). This poor alignment may result in a suboptimal polarization extinction ratio (PER) and reduced performance. FIG. 1D is an elevated and partially exploded view of a FAU 114 similar to the one presented in FIG. 1C. In the version shown in FIG. 1D, the glass end sections 107 of the fibers 102 are bent in the lateral direction (along the X-axis here) and secured to the array 124 of grooves 126 (see FIG. 1C). While this may reduce the pitch between the glass end sections 107 of fibers at the array 124, this also may create issues with maintaining the linear position and/or rotational position of the fibers. This concern has caused many to avoid using this lateral bending approach. In particular, the issues have caused many to avoid the lateral bending approach where polarization maintaining fiber arrays are used because controlling the rotational position of fibers may be critical for such arrays.

Further details about fiber ribbons and fiber bending may be found in U.S. Pat. Publ. No. 2021-0055490 to Bennett et al., which possesses the title "High-density FAUs and optical interconnection devices employing small diameter low attenuation optical fiber," and which is incorporated by reference herein in its entirety.

Figure 2A:
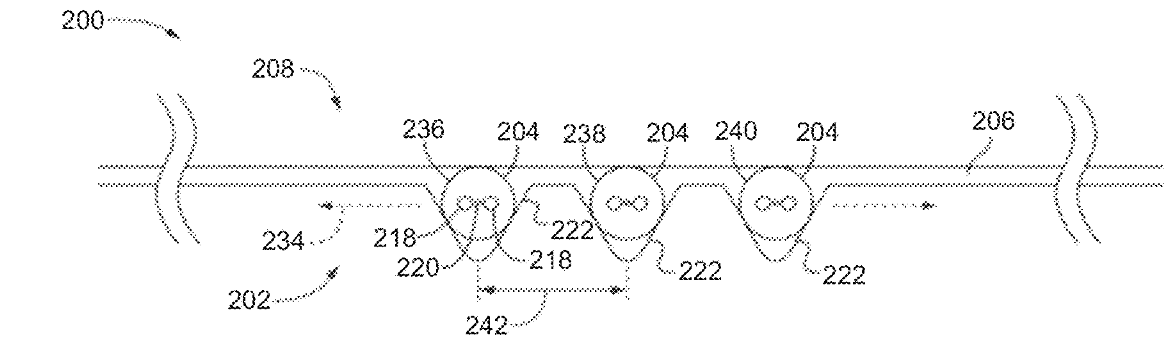
FIG. 2A is a schematic end view of the polarization maintaining fiber array, in accordance with some embodiments discussed herein.

Polarization maintaining fiber arrays may be utilized, and where these arrays are utilized, appropriate control of the rotational position of fibers has an even greater importance. FIG. 2A illustrates a polarization maintaining fiber array 200. A substrate 202 and a cover 208 are provided. The substrate 202 defines main grooves 222, and fibers 204 are received in the main grooves 222. A first fiber 236, a second fiber 238, and a third fiber 240 are provided. The fibers 204 are polarization maintaining optical fibers, with a central core 220 and two stress rods 218. The central core 220 is provided in the center of the cross section of the polarization-maintaining optical fiber 204 and the two stress rods 218 are provided on opposite sides of the central core 220. Maintaining a proper rotational position of a polarization-maintaining optical fiber 204 is important, as a deviation in the relative rotational position of the stress rods 218 of the polarization maintaining optical fibers 204 may cause a lower PER value which may or may not fall within the specifications required for the polarization maintaining fiber.

Epoxy 206 is provided in a gap between the substrate 202 and the cover 208. The first fiber 236, the second fiber 238, and the third fiber 240 are aligned in the horizontal plane 234. The first fiber 236 and the second fiber 238 are separated by a horizontal distance called a pitch 242, and the same pitch is used between other fibers.

Figure 2B:
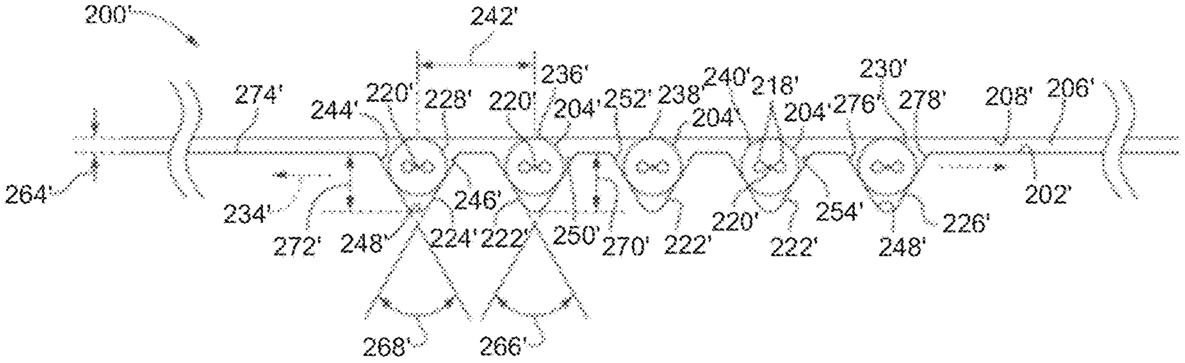
FIG. 2B is a schematic end view of another polarization maintaining fiber array, in accordance with some embodiments discussed herein.

FIG. 2B illustrates an alternative polarization maintaining fiber array 200'. This array 200' also has a substrate 202' and a cover 208'. The substrate 202' defines five grooves, with three main grooves 222' in the center, a first additional groove 224' on the left, and a second additional groove 226' on the right. The three main grooves 222' include the first main groove 250', the second main groove 252', and the third main groove 254'. The main grooves 222' as well as the first and second additional grooves 224', 226' are V-grooves such that they have linear sides that form a generally V-shape. For example, the first additional groove 224' has first and second linear sides 244', 246', and the second additional groove 226' has a first and second linear sides 276', 278'. The linear sides may define groove angles. For example, the linear sides of the first main groove 250' define a groove angle 266', and the linear sides 244', 246' of the first additional groove 224' define a groove angle 268'. These also include a rounded base 248'. The grooves define a groove depth, with the main grooves 222' defining a main groove depth 270' and with the first and second additional grooves 224' and 226' defining an additional groove depth 272'. The grooves are also defined with a pitch 242', where the pitch 242' is the distance between the centerpoint of two grooves. Thus, fibers provided in the grooves will possess the same pitch 242'.

A group of fibers 204' are received in the main grooves 222'. This group of fibers 204' includes a first fiber 236', a second fiber 238', and a third fiber 240'. The fibers 204 are polarization maintaining optical fibers, each with a central core 220' and two stress rods 218'. A first dummy fiber 228' is provided in the first additional groove 224', and a second dummy fiber 230' is provided in the second additional groove 226'. The polarization maintaining optical fibers 204', the first dummy fiber 228', and the second dummy fiber 230' each protrude the same distance 264' above the top planar surface 274' of the substrate 202'. In this way, a gap is defined between the substrate 202' and the cover 208', and the gap is defined by the distance 264'. Epoxy 206' is provided in the gap. The fibers may each be aligned in the horizontal plane 234'. The first and second dummy fibers 228', 230' alleviate forces on other fibers 204', resulting in an increased PER.

Further details about polarization maintaining fiber arrays may be found in U.S. Pat. No. 10,816,326 to Chang et al., which possesses the title "Polarization maintaining fiber array with increased polarization extinction ratio and method of making," and which is incorporated by reference herein in its entirety.

Some embodiments of the present invention contemplate various methods, systems, and devices that assist in maintaining the relative position of separate fibers so that fibers may subsequently be aligned and connected to an interface. Regardless of whether the fibers are bent after being secured to the fiber holder, the fiber holder may assist in retaining fibers in the correct linear (e.g., lateral) position and/or rotational position. This may permit fibers to be provided with an increased density and a reduced pitch. This may be accomplished without deteriorating the connection and/or the PER between the fiber core sections and the interface. Additionally, an increased number of fiber arrays will meet the desired output tolerances for polarization maintaining fiber arrays.

Systems and devices herein also include embodiments where a fiber holder is configured to control the position of individual fibers that are not retained within a fiber ribbon. After connection of a fiber holder, the relative rotational position of the fibers with respect to the Z-axis (the axis that the fibers generally extend parallel to) do not change even if the fibers are bent, and the PER may be maintained at an optimal level. By avoiding the need for a customized fiber ribbon, the fiber array design may be achieved more rapidly and with increased cost-efficiency.

Where polarization maintaining optical fibers are used, these fibers may be aligned with alignment slots in the fiber holder while the fibers are straight. The fiber holder and associated systems and methods described herein provide a solution to locally ribbonize the polarization maintaining optical fiber allowing the fiber array to be secured appropriately, with the securement being achieved more rapidly and with increased cost-efficiency. One challenge in development of a polarization maintaining optical fiber ribbon is maintaining the relative rotational position of the fibers over long distance. Providing a fiber ribbon may be very costly over long distances, and the localized fiber holder solution provides much greater cost-efficiency.

Figure 3A:
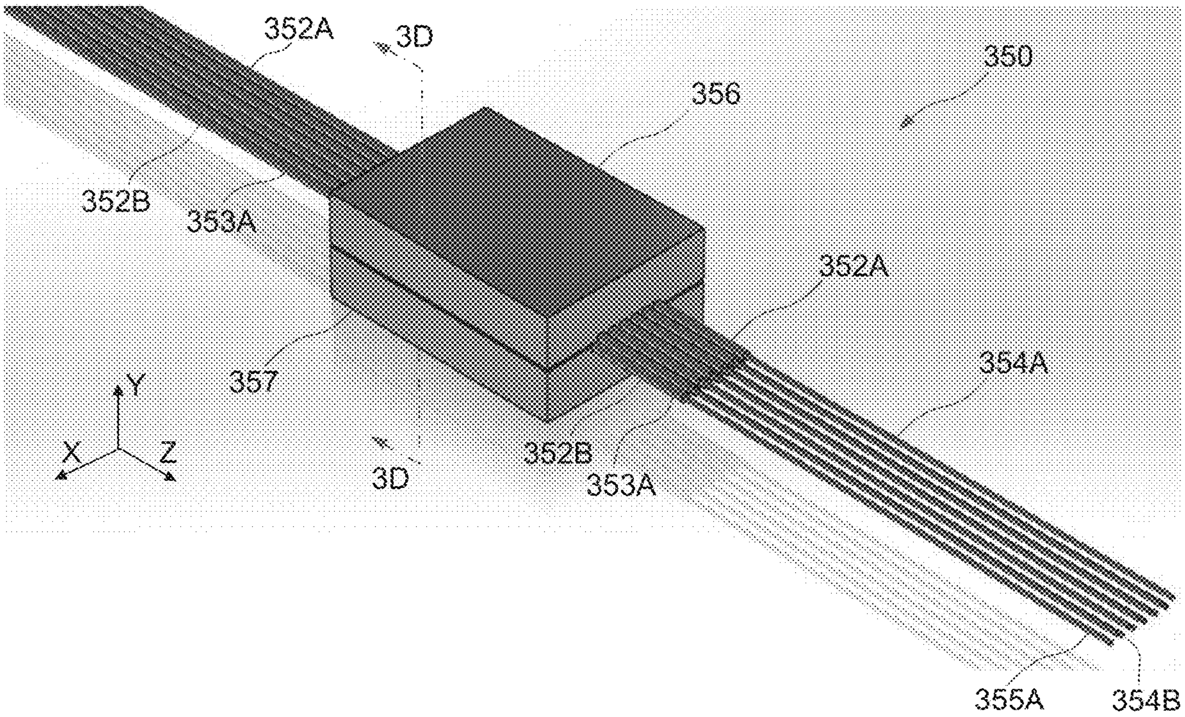
FIG. 3A illustrates a perspective view of an example fiber holder and associated fibers in accordance with some embodiments discussed herein.
Figure 3B:
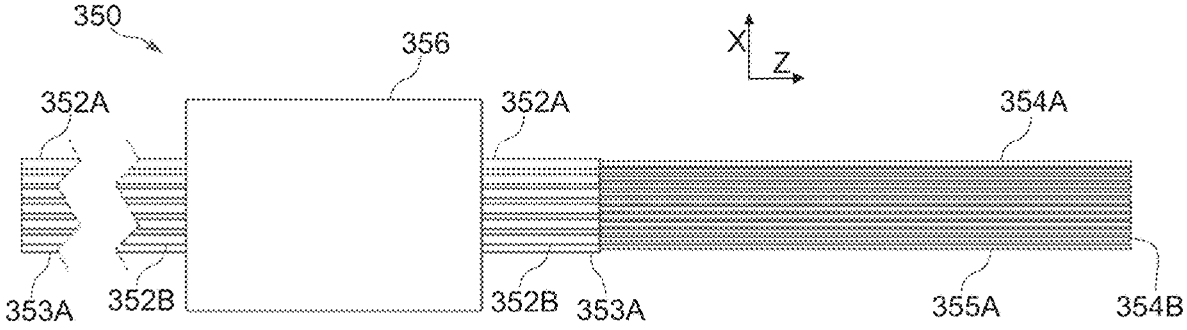
FIG. 3B illustrates a top view of the example fiber holder and associated fibers shown in FIG. 3A, in accordance with some embodiments discussed herein.
Figure 3C:
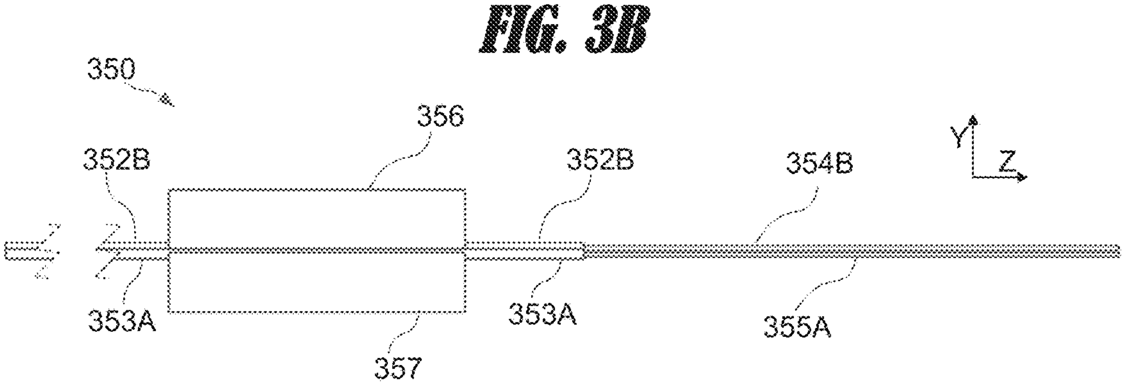
FIG. 3C illustrates a side view of the example fiber holder and associated fibers shown in FIG. 3A, in accordance with some embodiments discussed herein.

FIG. 3A-3C illustrate an example embodiment of a fiber holder that may be used by various systems, methods, and apparatuses described herein. FIG. 3A illustrates a perspective view, FIG. 3B illustrates a top view normal to the Y-axis, and FIG. 3C illustrates a side view normal to the X-axis. A plurality of fibers may be provided. In the embodiment illustrated in FIG. 3A, a first set 352 (see FIG. 3D) of two or more fibers and a second set 353 (see FIG. 3D) of two or more fibers are provided. The first set 352 of two or more fibers includes at least a first fiber 352A and a second fiber 352B. The second set 353 of two or more fibers may include its own first fiber 353A.

The fibers may comprise a core section and at least one coating surrounding the core section. For example, the first fiber 352A has a core section 354A, and this core section 354A is visible in the lower-right-hand portions of FIG. 3A. The at least one coating may include an outer coating that is the outermost layer of coating. The first fiber 352A has an outer coating 349A (FIG. 3F) surrounding the core section 354A in other portions of FIG. 3A. The core section 354B corresponds to the second fiber 352B of the first set 352 of two or more fibers, and the core section 355A corresponds to the first fiber 353A of the second set 353 of two or more fibers. In some embodiments, the fiber diameter (including all layers of coating) has a tolerance of ±20 μm. However, in other embodiments, the fiber diameter has a tolerance of ±10 μm.

Figure 3D:
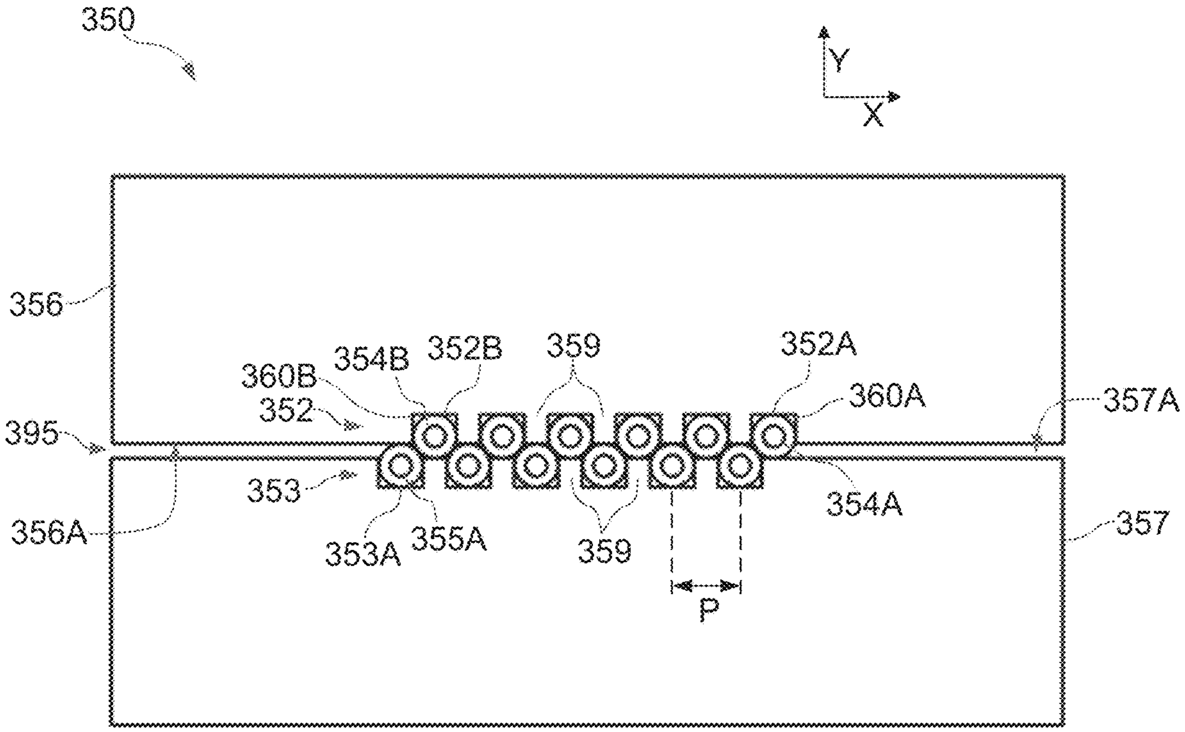
FIG. 3D illustrates a cross-sectional view of the example fiber holder and associated fibers taken along line 3D-3D in FIG. 3A, in accordance with some embodiments discussed herein.

With reference to FIG. 3D, each fiber of the first set 352 of two or more fibers may be provided at a first Y-position with respect to the Y-axis, and each fiber of the second set 353 of two or more fibers may be provided at a second Y-position with respect to the Y-axis. The first Y-position and the second Y-position may be different so that the first set 352 of two or more fibers and the second set 353 of two or more fibers are offset from each other.

FIG. 3A-3C also illustrates a fiber holder 350 with a first portion 356 and a second portion 357. As discussed below, the first portion 356 and the second portion 357 may include alignment slots 360 (see FIG. 3F) to assist in controlling the position of the fibers.

The fiber holder 350 may assist in maintaining fibers in a certain rotational and/or lateral position. The fiber holder 350 may include alignment slots 360, and these alignment slots 360 may be provided in a manner to enhance the amount of friction acting on the fibers to maintain them in the desired position.

These features may be more readily understood in reference to FIG. 3D. FIG. 3D illustrates a cross-sectional view of a fiber holder 350 taken along line 3D-3D in FIG. 3A. FIG. 3D illustrates a fiber holder 350 with a first portion 356 and a second portion 357. The first portion 356 may have a first surface 356A, and the first surface 356A is the bottom surface of the first portion 356 in the illustrated embodiment. The second portion 357 may have a second surface 357A, and the second surface 357A is the top surface of the second portion 357 in the illustrated embodiment. A plurality of alignment slots 360 may be provided in the first surface 356A and the second surface 357A. These alignment slots 360 may define recesses, and the recesses formed by the slots may be configured to extend any distance along the Z-axis so that a fiber resting at least partially within these recesses will extend along the Z-axis. In some embodiments, the alignment slots may define a length within a range of approximately 3 mm to 5 mm along the Z-axis.

A fiber holder 350 having a first alignment slot 360A and a second alignment slot 360B is illustrated in FIG. 3D. The first alignment slot 360A may be configured to receive a first fiber 352A, and the first alignment slot 360A may define a first recess within the first surface 356A of the fiber holder 350. In some embodiments, this first surface 356A may be defined within the first portion 356. The first recess may be configured to receive at least a portion of the first fiber 352A therein such that an outer coating 349A (see FIG. 3F) of the first fiber 352A rests within the first recess to provide frictional resistance to resist movement of the first fiber 352A.

Similarly, the second alignment slot 360B may be configured to receive a second fiber 352B, and the second alignment slot 360B may define a second recess within the first surface 356A of the fiber holder 350. In some embodiments, this first surface 356A may be defined within the first portion 356 so that the second alignment slot 360B is provided on the first portion 356. The second recess may be configured to receive at least a portion of the second fiber 352B therein such that an outer coating (similar to 349A of FIG. 3F) of the second fiber 352B rests within the second recess to provide frictional resistance to resist movement of the second fiber 352B.

The first alignment slot 360A is positioned in a fixed spaced apart manner from the second alignment slot 360B in at least one of a direction along a Y-axis or a direction along an X-axis so as to maintain at least a relative position of the first fiber 352A and the second fiber 352B with respect to each other.

In some embodiments, the first portion 356 may be configured to contact the first fiber 352A at two or more distinct locations, and the second portion 357 may be configured to contact the first fiber 352A at at least one location. In this way, the first portion 356 and the second portion 357 provide frictional resistance to resist movement of the first fiber 352A. In the illustrated embodiment, the first portion 356 contacts the first fiber 352A at at least three distinct locations on the left side, the top, and the right side of the first fiber 352A, and the second portion 357 contacts the first fiber 352A at at least one distinct location at the bottom of the first fiber 352A. The coating on the fibers may comprise polymer coating, and the coating may be configured to operate at high temperatures. Metal, ceramic, glass, or rubber material may be used for the coating as well, but a wide variety of other materials may be used. In some embodiments, the coating may comprise a ductile material that may be distorted in shape—thus, when fibers are placed within recesses defined by alignment slots, the contact surface area between the fibers and the alignment slots may be increased so that the amount of friction acting on the fibers may be increased. However, in other embodiments, the coating may be made of rigid material that will not be easily distorted in shape.

Additionally, the second portion 357 may be configured to contact a first fiber 353A of the second set of fibers 353 at two or more distinct locations, and the first portion 357 may be configured to contact the first fiber 352*a* at at least one location. In this way, the first portion 356 and the second portion 357 provide frictional resistance to resist movement of the fiber 353A. In the illustrated embodiment, the first portion 356 contacts the first fiber 353A at at least one distinct location on the top side of the first fiber 353A, and the second portion 357 contacts the first fiber 353A at at least three distinct locations at the left side, the bottom side, and the right side of the first fiber 353A. The cross-sectional shape of the alignment slots 360 may be altered to provide the desired amount of friction between the fibers and the wall or walls forming alignment slots 360.

Protrusions 359 may be provided between the alignment slots 360. In the illustrated embodiments, the protrusions 359 extend so that three fibers may contact each protrusion 359. A different fiber may contact each protrusion 359 at a distal surface and at the two side surfaces of each protrusion 359. The protrusions 359 may assist in defining the pitch between two adjacent fibers in the same set of fibers. The protrusions 359 may also assist in defining the size of a gap 395 between the first surface 356A of the first portion 356 and the second surface 357A of the second portion 357. In some embodiments, each protrusion 359 may be configured to contact a fiber from the first set of fibers 352 while also contacting a fiber from the second set of two or more fibers 353.

As illustrated in FIG. 3D, the alignment slots 360 of the first portion 356 and the alignment slots 360 of the second portion 357 may be offset from each other along the X-axis. In this way, the second set of fibers 353 may be provided at intermittent positions between fibers of the first set of fibers 352 along the X-axis. In some embodiments, the first portion 356 and the second portion 357 of the fiber holder 350 may be configured to position the first set 352 of two or more fibers and the second set 353 of two or more fibers adjacent to each other so that the first set 352 of two or more fibers and the second set 353 of two or more fibers contact each other. In doing so, the amount of frictional resistance acting on the fibers may be increased. However, in other embodiments, the fibers will not contact each other, and the contact with other surfaces may sufficiently hold the fibers in place.

In the illustrated embodiment, the first portion 356 and the second portion 357 are identical in shape. In the embodiment illustrated in FIG. 3D, the second portion 357 is simply rotated about the Z-axis so that the alignment slots 360 of the first portion 356 and the second portion 357 are offset from each other. By making the first portion 356 and the second portion 357 identical, the cost of manufacturing the fiber holder 350 may be reduced without deteriorating the positional control of the fiber holder 350.

Alignment slots 360 may be positioned in a fixed spaced apart manner from the adjacent alignment slots in at least one of a direction along a Y-axis or a direction along an X-axis so as to maintain at least a relative position of the fibers positioned in the adjacent alignment slots. In the embodiments illustrated in FIG. 3A-3F, the alignment slots 360 are positioned along the X-axis. The center of alignment slots 360 may be separated by a pitch (P). The alignment slots 360 illustrated in FIG. 3D possess a partial rectangular cross-sectional shape. However, other cross-sectional shapes may be used, including but not limited to a partial triangular shape, a partial trapezoidal shape, or a partial curvilinear shape.

Figure 3E:
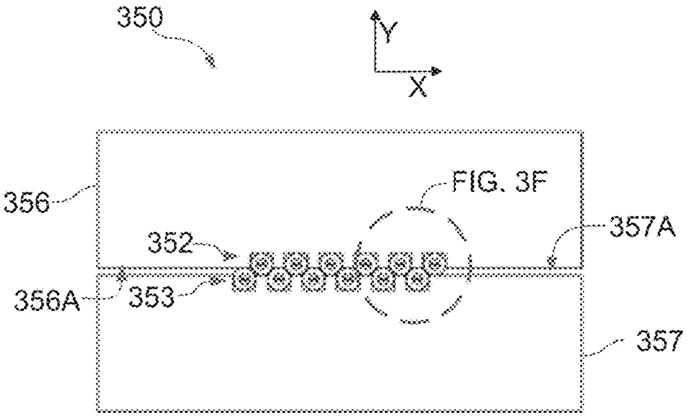
FIG. 3E illustrates a cross-sectional view of another example fiber holder and associated fibers, wherein the fibers are polarization-maintaining optical fibers, in accordance with some embodiments discussed herein.
Figure 3F:
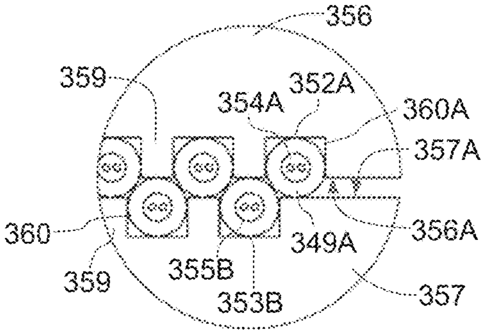
FIG. 3F illustrates an enhanced, cross-sectional view of the fiber holder depicted in FIG. 3E, in accordance with some embodiments discussed herein.
Figure 3G:
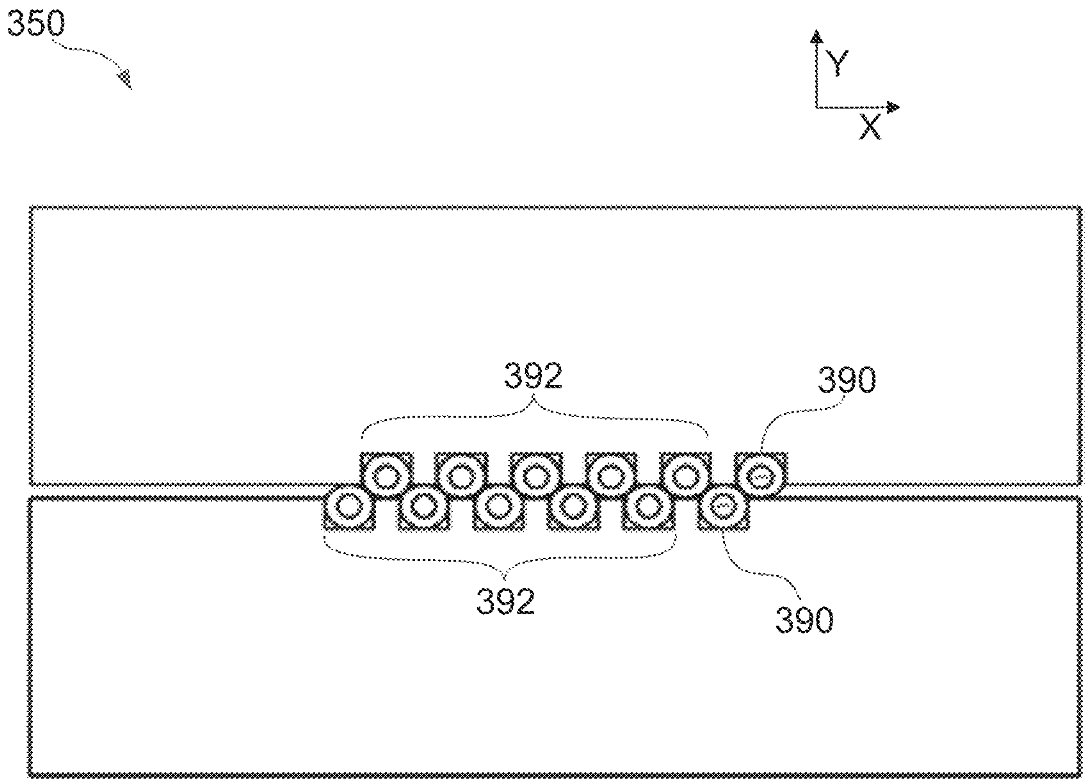
FIG. 3G illustrates a cross-sectional view of another example fiber holder and associated fibers, wherein some but not all of the fibers are polarization-maintaining optical fibers, in accordance with some embodiments discussed herein.

The fibers may include one or more polarization-maintaining optical fibers in some embodiments, and the fiber holder 350 may be particularly advantageous in managing these polarization-maintaining optical fibers. FIGS. 3E-3G illustrate various cross sectional views with different types of fibers provided. FIG. 3E illustrates an alternative cross-sectional view of a fiber holder 350 taken along line 3D-3D in FIG. 3A where all fibers of the plurality of fibers are polarization-maintaining optical fibers, and FIG. 3F is an enhanced view of FIG. 3E in the region indicated within FIG. 3E.

As illustrated in FIG. 3E, a first portion 356 and a second portion 357 may be provided, and a first set of fibers 352 and a second set of fibers 353 may be provided in alignment slots 360 defined within the first portion 356 and the second portion 357. As illustrated in FIG. 3F, each of the provided fibers may be polarization-maintaining optical fibers. In addition to the first fiber 352A of the first set of fiber 352 discussed above, FIG. 3F also illustrates a fiber 353B of the second set of fibers 353 (see FIG. 3E) with a core section 355B. Alignment slots 360 may be provided within the first surface 356A of the first portion 356 and within the second surface 357A of the second portion 357. Alignment slots 360 may define a recess within the surfaces 356A, 357A, and the defined recesses may be configured to receive at least a portion of a fiber therein such that an outer coating of the fiber rests within a recess to provide frictional resistance to resist movement of the fiber. For example, referring to the first fiber 352A of the first set of fibers 352, this fiber 352A rests at least partially within the recess formed by an alignment slot 360 so that the outer coating 349A of the fiber rests within the recess to provide frictional resistance. This may assist in resisting movement of the fiber 352.

The first portion 356 may be configured to contact a fiber (e.g. first fiber 352A of the first set 352 of two or more fibers) at two or more distinct locations and the second portion 357 is configured to contact the fiber at at least one location, and the first portion 356 and the second portion 357 may provide frictional resistance to resist movement of the fiber. Where polarization-maintaining optical fibers are utilized, the outer coating 349A of the first fiber 352A rests within the first recess defined by the first alignment slot 360A to provide frictional resistance to resist rotational movement of the first fiber 352A, and the outer coating (similar to 349A) of the second fiber 352B (see FIG. 3D) rests within the second recess defined by the second alignment slot 360B to provide frictional resistance to resist rotational movement of the second fiber 352B.

FIG. 3G is another alternative cross-sectional view of a fiber holder 350 taken along line 3D-3D in FIG. 3A where some but not all of the fibers are polarization-maintaining optical fibers. In FIG. 3G, the two fibers on the right hand side are polarization-maintaining optical fibers 390, and the remaining fibers 392 are not polarization-maintaining optical fibers. All other features within FIG. 3G are similar to those of FIG. 3D.

Figure 4A:
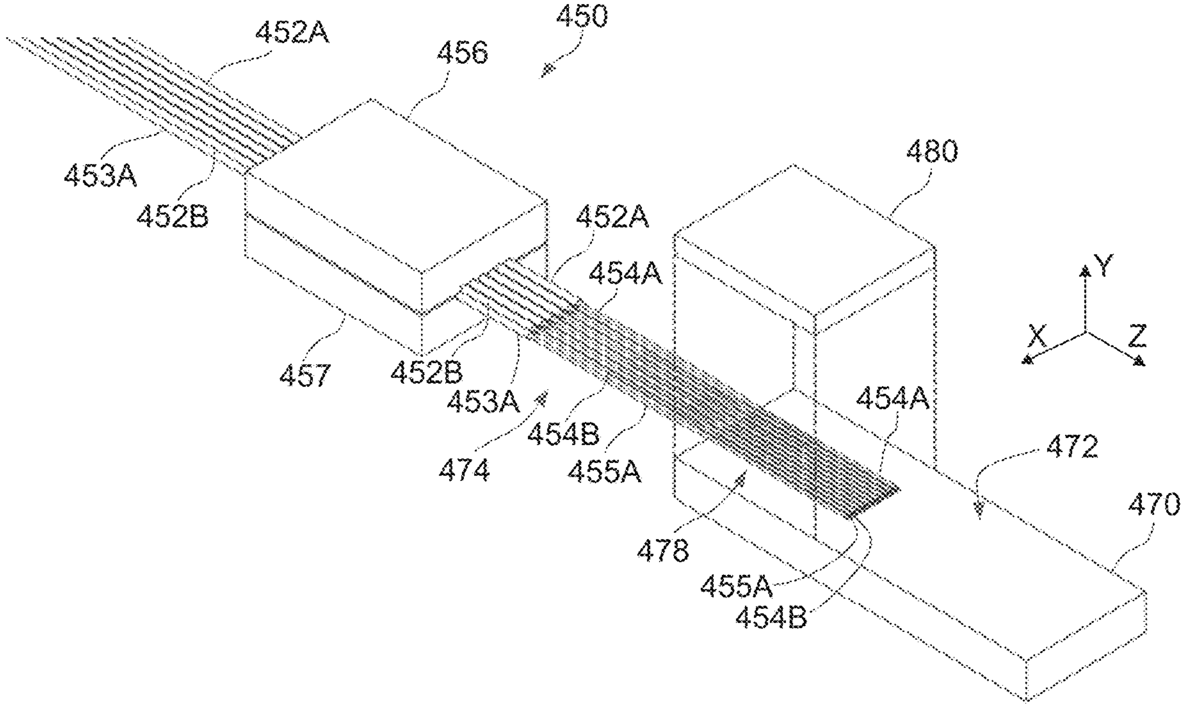
FIG. 4A illustrates a perspective view of a system for installing fibers to an interface with an example fiber holder and associated fibers, in accordance with some embodiments discussed herein.
Figure 4B:
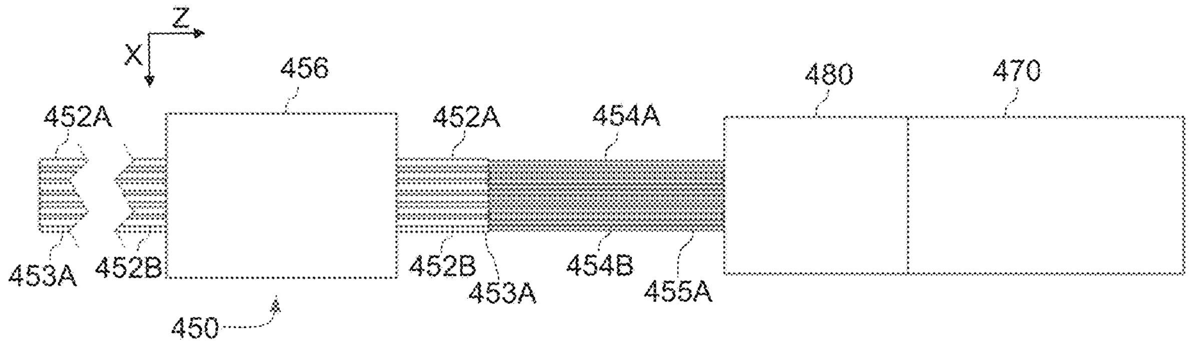
FIG. 4B illustrates a top view of the system of FIG. 4A, in accordance with some embodiments discussed herein.
Figure 4C:
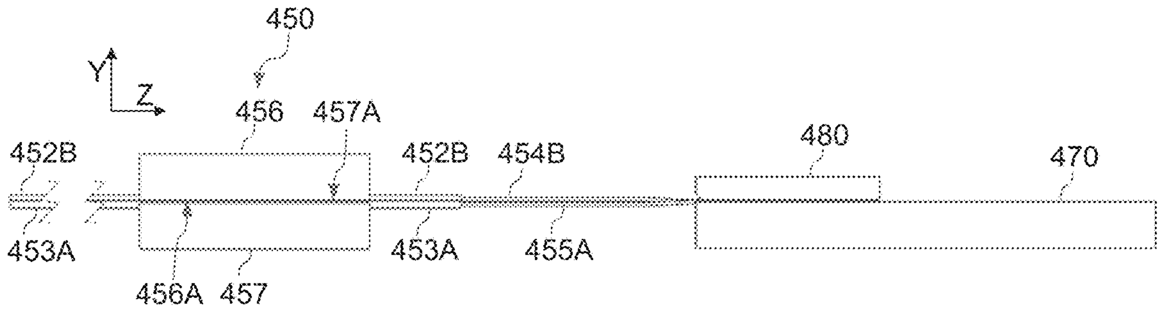
FIG. 4C illustrates a side view of the system of FIG. 4A, in accordance with some embodiments discussed herein.

The fiber holders may assist in facilitating the connection of fibers to an interface, ensuring that the fibers are provided at the correct lateral and rotational position. FIGS. 4A-4C illustrate this connection from various perspectives. FIG. 4A illustrates a perspective view of a system with a fiber holder, FIG. 4B illustrates a top view of the system, and FIG. 4C illustrates a side view of the system.

In FIG. 4A, an interface 470 is illustrated. This interface 470 may define a top surface 472, and a plurality of grooves 478 may be defined within the top surface 472. These grooves 478 may each define a recess that may receive at least a portion of the fiber core sections. In this way, the grooves 478 may assist in controlling the relative position of the fiber core sections and may also assist in holding the fiber core sections in place. In some embodiments, the interface 470 may be a photonic chip.

FIG. 4A also includes a fiber holder 450 with a first portion 456 and a second portion 457 similar to those described above. The fiber holder 450 may secure a first set of fibers including a first fiber 452A and a second fiber 452B as well as a second set of fibers including a first fiber 453A. As discussed above, each of these fibers may have a core section. For example, the first fiber 452A and the second fiber 452B of the first set of fibers may possess core section 454A and core section 454B respectively. Additionally, the first fiber 453A of the second set of fibers may possess a core section 455A.

Figure 5A:
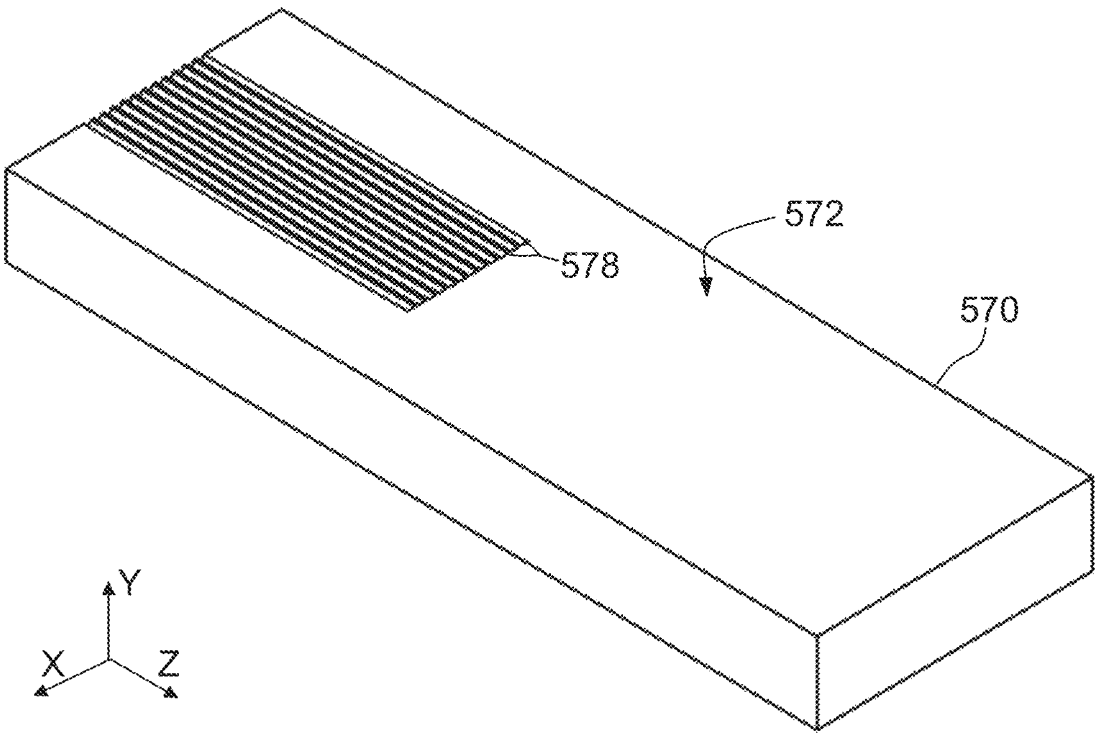
FIG. 5A illustrates a perspective view of an example interface that may be used in conjunction with a fiber holder in accordance with some embodiments discussed herein.
Figure 5B:
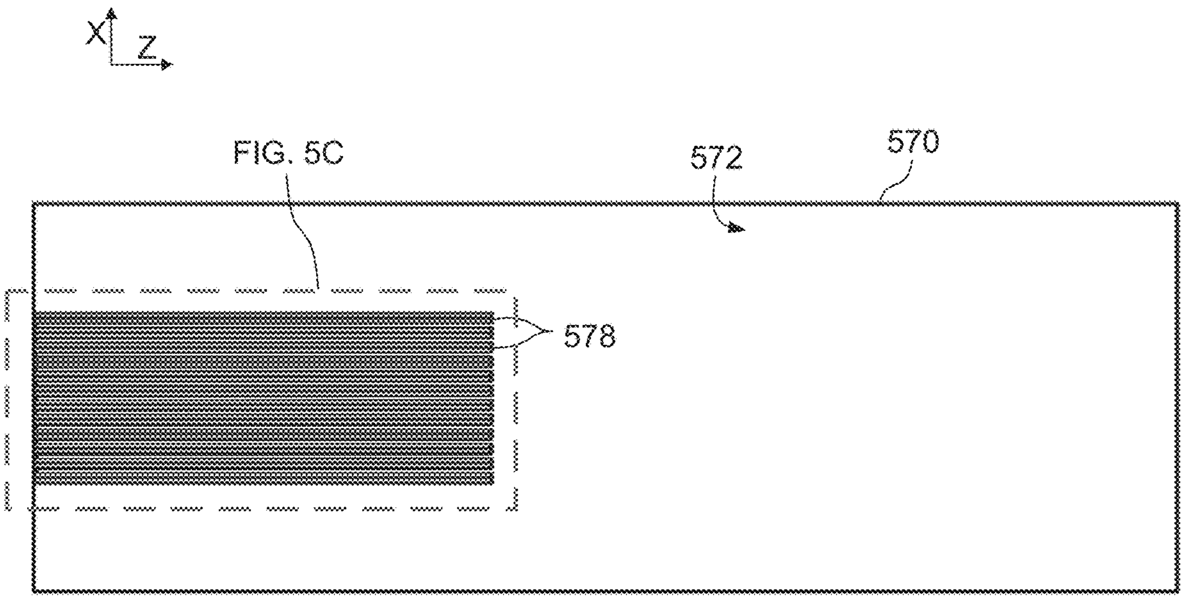
FIG. 5B illustrates a top view of the interface of FIG. 5A, in accordance with some embodiments discussed herein.
Figure 5C:
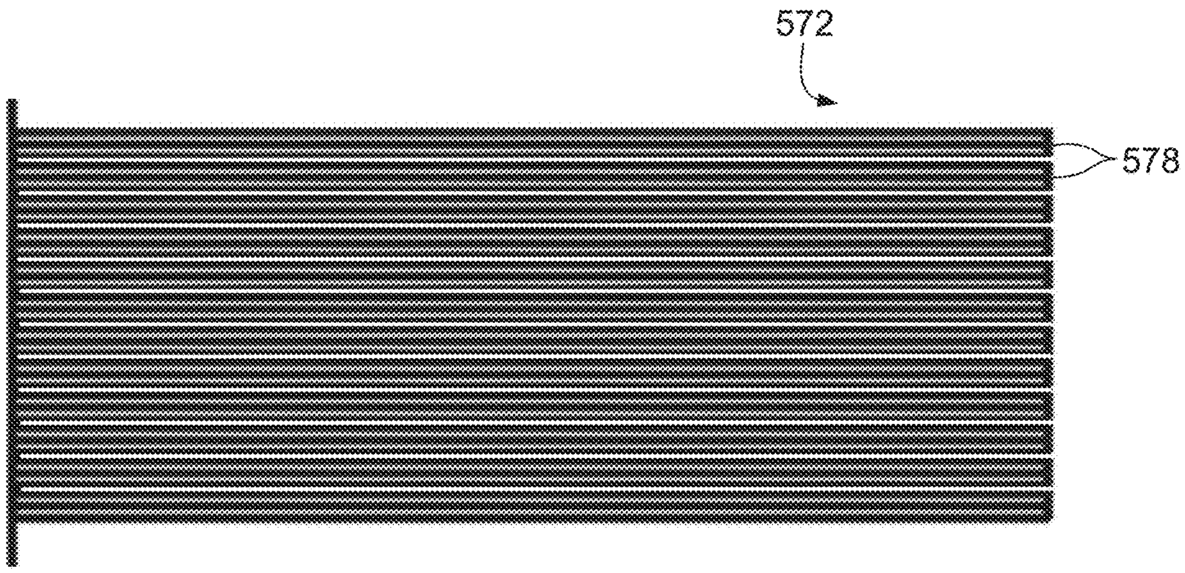
FIG. 5C illustrates an enhanced, top view of the interface presented in FIG. 5B, in accordance with some embodiments discussed herein.

At the area proximate to the fiber holder 450, the fibers may be interleaved together so that some fibers are positioned at a first Y-position and other fibers are positioned at a second Y-position. In an intermediate region 474 between the fiber holder 450 and the interface 470, at least one layer of outer coating may be removed from the fibers, and the fiber core sections and any remaining layers of outer coating may be reconfigured so that each of the fiber core sections are at the same Y-position. An example of this is illustrated in FIG. 4C, and an example interface 570 having grooves 578 at the same Y-position is illustrated in FIGS. 5A-5C. Fiber core sections may be secured in the grooves 478 in an alternating fashion so that a fiber from the first set of fibers is provided in one groove and then a fiber from the second set of fibers is provided in an adjacent groove. Once the fiber core sections are secured as desired, the cover 480 may be pushed downwardly to further secure the fiber core sections in place. In some embodiments, all layers of outer coating are removed in the intermediate region 474 and only the fiber core sections are provided in the intermediate region 474 and at the grooves 478.

In some embodiments, the fiber holder 450 is capable of being removed after the fibers are connected to the interface 470. However, in other embodiments, the fiber holder 450 may be configured to remain secured to the fibers even after a connection is formed with the interface 470. In some embodiments, a bonding agent (such as an epoxy or an adhesive) may be applied in the alignment slots and/or between the first surface and second surface of the first portion and the second portion respectively.

The fiber holder 450 may be configured to control the position of fibers so that they may be appropriately secured to an interface 470. FIGS. 5A-5C illustrate example interfaces 570 that may be used in conjunction with a fiber holder (see 450, FIG. 4A). FIG. 5A illustrates a perspective view of the interface 570, FIG. 5B illustrates a top view of the interface 570 that is normal to a Y-axis, and FIG. 5C illustrates an enhanced view of the interface 570 presented in FIG. 5B. The interface 570 may comprise a top surface 572, and one or more grooves 578 may be defined within the top surface 572. In the illustrated embodiment within FIG. 5A, the grooves 578 are V-grooves, but other types of grooves may be used in other embodiments. The grooves 578 may facilitate the connection of the separate fibers to the interface 570. A cover 480 (see FIGS. 4A-4C) may be provided above the interface 570 after fibers are appropriately secured within the grooves 578. In some embodiments, the interface 570 may be a photonic chip.

FIGS. 5A-5C illustrate an example interface 570 having grooves 578 at the same Y-position. However, in other embodiments, the grooves of the interface 570 may be offset from each other in the Y-direction. An example of such is illustrated in the cross sectional view of an example interface 570' in FIG. 5D. The interface 570' includes a first groove 578A' and a second groove 578B' that possess different positions along the Y-axis. The cover 580' may also have its own grooves 579A' and 579B', and these grooves 579A', 579B' may also possess different positions along the Y-axis. In some embodiments, the recesses formed by the grooves may be configured so that they generally possess the same size so that each of the fibers 577' may be effectively secured within a recess. For example, the recesses formed by grooves 578A' and 579A' may generally have the same size as the recesses formed by grooves 578B' and 579B'. Additionally or alternatively, different grooves or groove pairs may define differently sized recesses, such as may correspond to differently sized fiber cores.

Figure 5D:
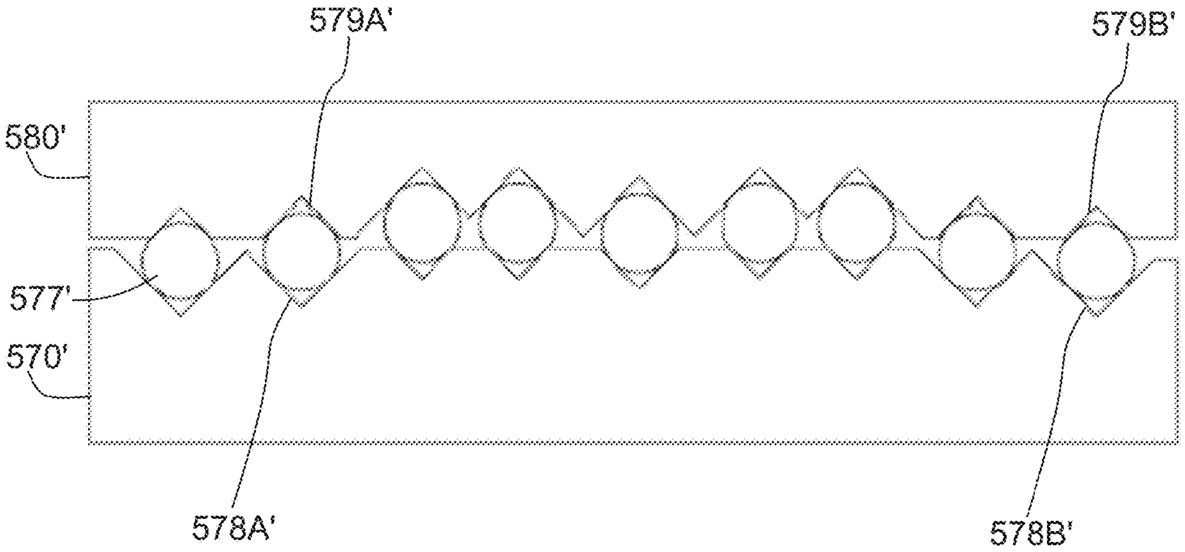
FIG. 5D illustrates a cross sectional view of an example interface and an example cover, in accordance with some embodiments discussed herein.

In some embodiments, the alignment slots of the fiber holder may be arranged (e.g., in the X-axis and Y-axis) to align with the corresponding positions of the grooves of the interface, such as, for example, the grooves 578A', 579A' and 578B', 579B' in FIG. 5D. In other embodiments, the alignment slots of the fiber holder may be positioned differently than the grooves of the interface.

Methods for installing a plurality of fibers are also provided so that the position of the fibers may be maintained. The methods described herein may assist in controlling or maintaining the linear and rotational position of fibers.

Figure 6:
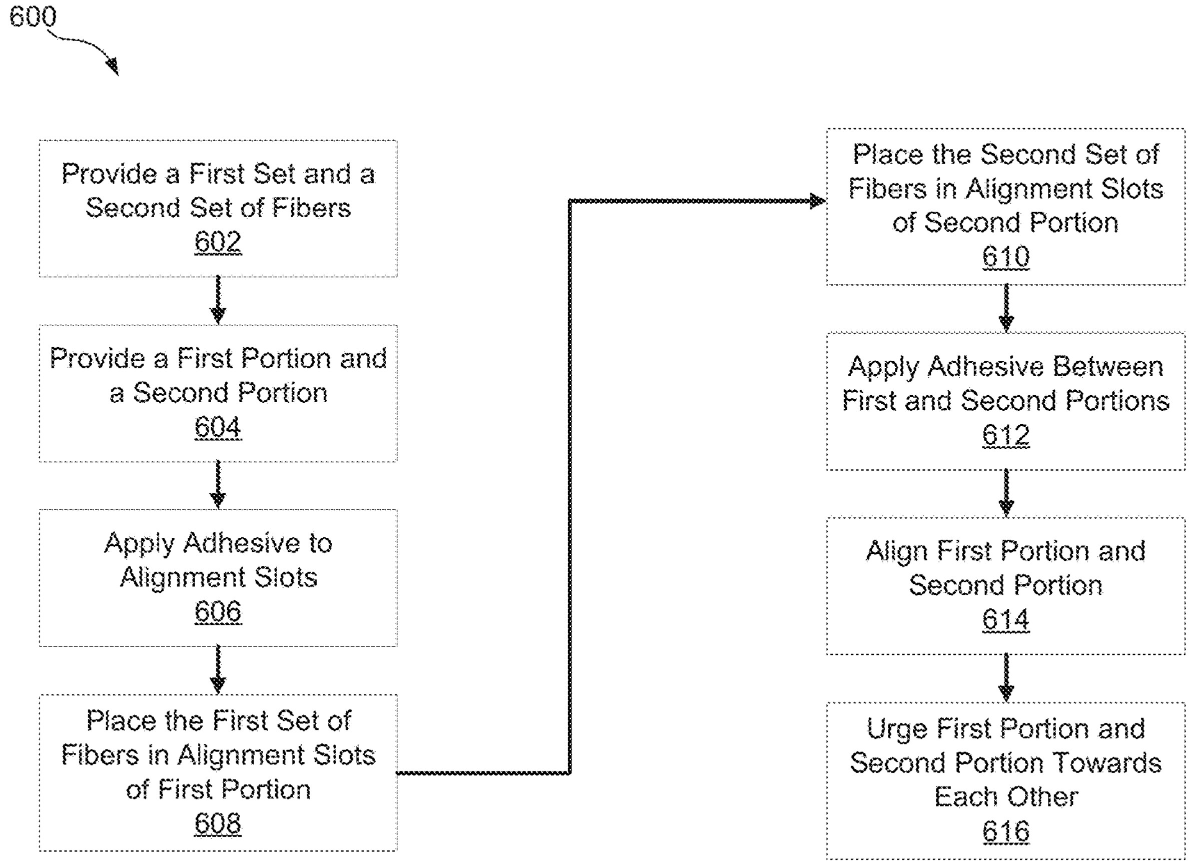
FIG. 6 is a flow chart illustrating an example method for maintaining relative rotational position of a plurality of fibers, in accordance with some embodiments discussed herein.

FIG. 6 is a flow chart illustrating an example method 600 for maintaining the relative rotational position of a plurality of fibers. At operation 602, a first set of two or more fibers are provided. A second set of two or more fibers are also provided at operation 602.

At operation 604, a first portion and a second portion may be provided. The first portion may have a first surface and two or more alignment slots defined in the first surface. The first portion may be configured to provide frictional resistance to resist rotation of the first set of two or more fibers. The second portion may have a second surface and two or more alignment slots defined in the second surface. The second portion may be configured to provide frictional resistance to resist rotation of the second set of two or more fibers.

At operation 606, adhesive may be applied to the two or more alignment slots defined within the first surface and/or the two or more alignment slots defined within the second surface. However, in some embodiments, operation 606 may not be performed.

At operation 608, the first set of two or more fibers are placed in the two or more alignment slots defined in the first surface, and, at operation 610, the second set of two or more fibers are placed in the two or more alignment slots defined in the second surface.

At operation 612, adhesive may be applied between the first surface of the first portion and the second surface of the second portion. However, this operation may not be performed in certain embodiments, such as where the first portion and the second portion are removed after installation. Adhesive may be applied at the first surface, at the second surface, or at both surfaces.

At operation 614, the first portion and the second portion are aligned. This may be done using fiducials, by aligning the side surfaces of the first portion and the second portion, or through other approaches.

At operation 616, the first portion and the second portion are urged towards each other. While doing so, the first surface and the second surface may be oriented so that they face each other. Consequently, fibers provided in the alignment slots may be secured between the first portion and the second portion.

After performing the operations of method 600, the fibers may be bent and/or secured to an interface. The method described above and detailed in FIG. 6 may be used with a variety of fibers. For example, the method may be used with an optical fiber. In some embodiments, an optical fiber may be provided in the form of a polarization-maintaining optical fiber.

The method 600 may be modified in various ways without departing from the scope of the invention. For example, the operations may be provided in a different order, certain operations may be added, or certain operations may be removed. For example, operations 606 and 612 may not be performed in some embodiments.

Figure 7:
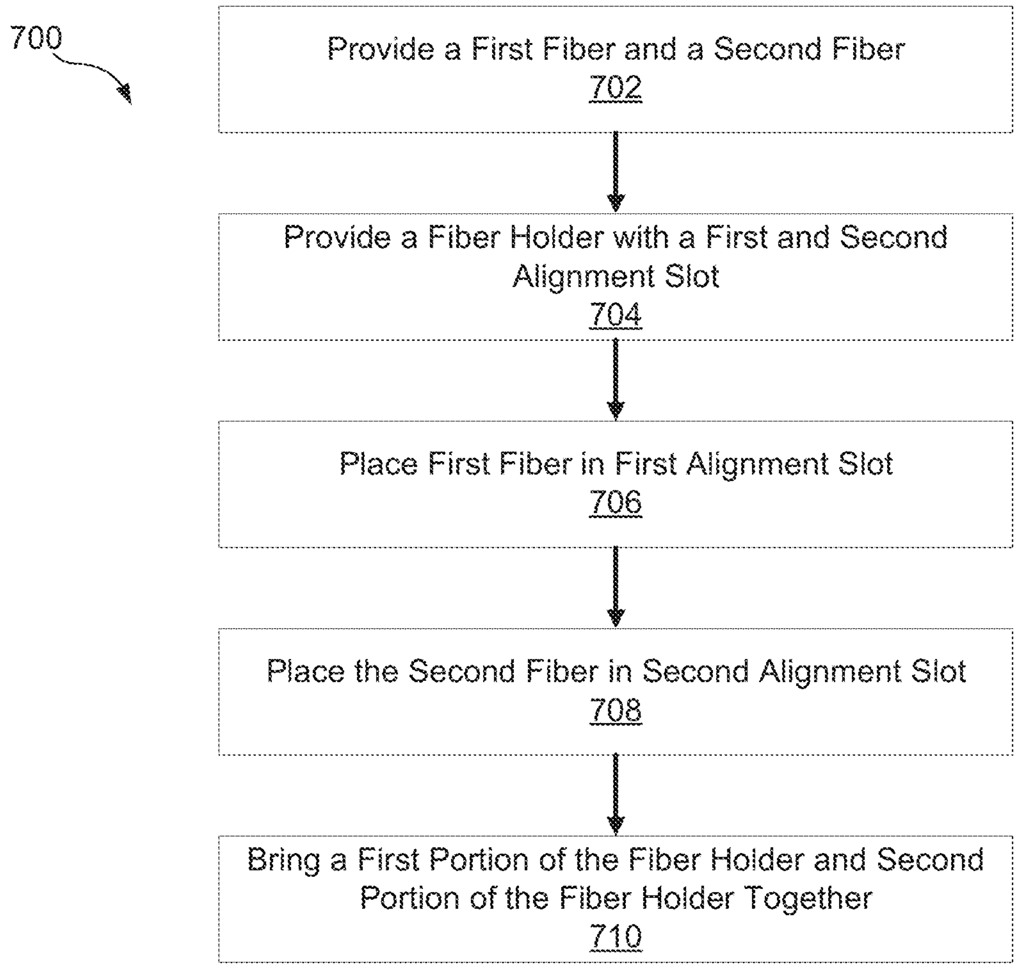
FIG. 7 is a flow chart illustrating another example method for maintaining relative position of a plurality of fibers, in accordance with some embodiments discussed herein.

Other methods for installing a plurality of fibers are also provided to assist in controlling or maintaining the lateral and/or rotational position of fibers. FIG. 7 is a flow chart illustrating another example method 700 for maintaining the relative position of a plurality of fibers. At operation 702, a first fiber and a second fiber are provided.

At operation 704, a fiber holder is provided. The fiber holder may have a first alignment slot for receiving a first fiber extending in a direction parallel to a Z-axis. The first alignment slot defines a first recess defined in a first surface of the fiber holder. The first recess is configured to receive at least a portion of the first fiber therein such that an outer coating of the first fiber rests within the first recess to provide frictional resistance to resist movement of the first fiber. The fiber holder may also have a second alignment slot for receiving a second fiber extending in a direction parallel to a Z-axis. The second alignment slot defines a second recess defined in the first surface of the fiber holder. The second recess is configured to receive at least a portion of the second fiber therein such that an outer coating of the second fiber rests within the second recess to provide frictional resistance to resist movement of the second fiber. The first alignment slot is positioned in a fixed spaced apart manner from the second alignment slot in at least one of a direction along a Y-axis or a direction along an X-axis so as to maintain at least a relative position of the first fiber and the second fiber with respect to each other. In some embodiments, the fiber holder comprises a first portion and a second portion, and the first alignment slot and the second alignment slot are provided on the first portion.

At operation 706, the first fiber may be placed within the first alignment slot. At operation 708, the second fiber is placed within the second alignment slot.

At operation 710, the method may further comprise bringing the first portion and the second portion together with the first fiber positioned within the first alignment slot and the second fiber within the second alignment slot. When the first portion and the second portion are brought together, the first portion and the second portion may provide frictional resistance to resist movement of the first fiber. For example, the first portion may be configured to contact the first fiber at two or more distinct locations and/or the second portion may be configured to contact the first fiber at at least one location. In some embodiments, operation 710 may not be performed. For example, where the fiber holder does not have a first portion and a second portion, and operation 710 may not be performed.

The method 700 may be modified in various ways without departing from the scope of the invention. For example, the operations may be provided in a different order, certain operations may be added, or certain operations may be removed. For example, operation 710 may not be performed in some embodiments, or operation 704 may be performed before or simultaneously with operation 702.

X, Y, and Z axes are illustrated in various figures, and these axes are also referenced in various portions of the specification. References to these axes are provided solely for the purposes of explaining how various components are positioned or oriented relative to each other. These axes are not intended to require that the fiber holder and other components must always be provided in a certain orientation (e.g. with the first holder positioned directly above the second holder). In other embodiments, the fiber holder and other components may have another orientation so that the fiber holder is angled relative to the horizontal plane. In some embodiments, the fiber holder may also be provided in an upright position so that the X-direction illustrated in FIG. 3A extends vertically.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended to be construed to limit the present invention or otherwise to exclude any such other embodiments, adaptations, variations, modifications and equivalent arrangements.

What is claimed is:

1. A system for maintaining relative position of separate fibers for performing a subsequent alignment and connection of the separate fibers to an interface, the system comprising:

a plurality of fibers extending parallel in a same direction along a Z-axis, wherein the plurality of fibers includes at least a first fiber and a second fiber, wherein each fiber of the plurality of fibers includes at least one coating and a core section; and a fiber holder comprising:

a first alignment slot for receiving the first fiber, wherein the first alignment slot defines a first recess defined in a first surface of the fiber holder, wherein the first recess is configured to receive at least a portion of the first fiber therein such that an outer coating of the first fiber rests within the first recess to provide frictional resistance to resist movement of the first fiber; and a second alignment slot for receiving the second fiber, wherein the second alignment slot defines a second recess defined in the first surface of the fiber holder, wherein the second recess is configured to receive at least a portion of the second fiber therein such that an outer coating of the second fiber rests within the second recess to provide frictional resistance to resist movement of the second fiber, wherein the first alignment slot is positioned in a fixed spaced apart manner from the second alignment slot in at least one of a direction along a Y-axis or a direction along an X-axis so as to maintain at least a relative position of the first fiber and the second fiber with respect to each other, wherein the plurality of fibers includes a first set of two or more fibers and a second set of two or more fibers, wherein the first set of two or more fibers includes the first fiber and the second fiber, wherein each fiber of the first set of two or more fibers are provided at a first Y-position with respect to the Y-axis, wherein each fiber of the second set of two or more fibers are provided at a second Y-position with respect to the Y-axis, and wherein the first Y-position and the second Y-position are different.

2. The system of claim 1, wherein the fiber holder comprises a first portion and a second portion, wherein the first alignment slot and the second alignment slot are provided on the first portion, wherein the first portion is configured to contact the first fiber at two or more distinct locations and the second portion is configured to contact the first fiber at at least one location, and wherein the first portion and the second portion provide frictional resistance to resist movement of the first fiber.

3. The system of claim 1, wherein the fiber holder comprises a first portion and a second portion, wherein the second portion is configured to contact a fiber of the second set of two or more fibers at two or more distinct locations and the first portion is configured to contact the same fiber of the second set of two or more fibers at at least one location.

4. The system of claim 1, wherein the first set of two or more fibers contact the second set of two or more fibers.

5. The system of claim 4, wherein the second set of two or more fibers are provided at intermittent positions between fibers of the first set of two or more fibers along the X-axis.

6. The system of claim 1, wherein the plurality of fibers include at least one polarization-maintaining optical fiber, wherein the outer coating of the first fiber rests within the first recess to provide frictional resistance to resist rotational movement of the first fiber, and wherein the outer coating of the second fiber rests within the second recess to provide frictional resistance to resist rotational movement of the second fiber.

7. The system of claim 6, wherein all fibers of the plurality of fibers are polarization-maintaining optical fibers.

8. The system of claim 6, wherein a polarization-maintaining optical fiber of the at least one polarization maintaining optical fiber comprises a core and two stress rods, wherein the core is provided in a center of a cross section of the polarization-maintaining optical fiber and the two stress rods are provided on opposite sides of the core.

9. The system of claim 1, wherein a plurality of alignment slots are defined within the first surface, and wherein a protrusion is provided between each of the plurality of alignment slots.

10. The system of claim 9, wherein the plurality of fibers includes a first set of two or more fibers and a second set of two or more fibers, wherein each fiber of the first set of two or more fibers are provided at a first Y-position with respect to the Y-axis, wherein each fiber of the second set of two or more fibers are provided at a second Y-position with respect to the Y-axis, and wherein the first Y-position and the second Y-position are different, wherein each protrusion is configured to contact a fiber of the first set of two or more fibers and a fiber of the second set of two or more fibers.

11. The system of claim 1, wherein the fiber holder is capable of being removed after the fibers are connected to the interface.

12. The system of claim 1, wherein at least one of the first alignment slot or the second alignment slot possess a cross sectional shape from at least one of a partial triangular shape, a partial trapezoidal shape, a partial rectangular shape, or a partial curvilinear shape.

13. The system of claim 1, wherein the fiber holder comprises a first portion and a second portion, and wherein the first portion and the second portion possess an identical shape.

14. A fiber holder for maintaining relative position of separate fibers for performing a subsequent alignment and connection of the separate fibers to an interface, the fiber holder comprising:

a first alignment slot for receiving a first fiber extending in a direction parallel to a Z-axis, wherein the first alignment slot defines a first recess defined in a first surface of the fiber holder, wherein the first recess is configured to receive at least a portion of the first fiber therein such that an outer coating of the first fiber rests within the first recess to provide frictional resistance to resist movement of the first fiber;

a second alignment slot for receiving a second fiber extending in a direction parallel to the Z-axis, wherein the second alignment slot defines a second recess defined in the first surface of the fiber holder, wherein the second recess is configured to receive at least a portion of the second fiber therein such that an outer coating of the second fiber rests within the second recess to provide frictional resistance to resist movement of the second fiber;

a first portion; and a second portion, wherein the first alignment slot is positioned in a fixed spaced apart manner from the second alignment slot in at least one of a direction along a Y-axis or a direction along an X-axis so as to maintain at least a relative position of the first fiber and the second fiber with respect to each other, wherein the first alignment slot and the second alignment slot are provided on the first portion, wherein the first portion is configured to contact the first fiber at two or more distinct locations and the second portion is configured to contact the first fiber at at least one location, and wherein the first portion and the second portion provide frictional resistance to resist movement of the first fiber, and wherein the first fiber and the second fiber are a part of a first set of two or more fibers, wherein each fiber of the first set of two or more fibers are provided at a first Y-position with respect to the Y-axis, wherein the first portion is configured to contact each fiber of the first set of two or more fibers at two or more distinct locations and the second portion is configured to contact each fiber of the first set of two or more fibers at at least one location, and wherein the second portion is configured to contact each fiber of a second set of two or more fibers at two or more distinct locations and the first portion is configured to contact each fiber of the second set of two or more fibers at at least one location, wherein each fiber of the second set of two or more fibers are provided at a second Y-position with respect to the Y-axis, and wherein the first Y-position and the second Y-position are different.

15. The fiber holder of claim 14, wherein, when the first portion and the second portion are brought together, the first set of two or more fibers contact the second set of two or more fibers.

16. The fiber holder of claim 14, wherein the first fiber comprises a polarization-maintaining optical fiber, wherein the outer coating of the first fiber rests within the first recess to provide frictional resistance to resist rotational movement of the first fiber.

* * * * *